Figure 1:
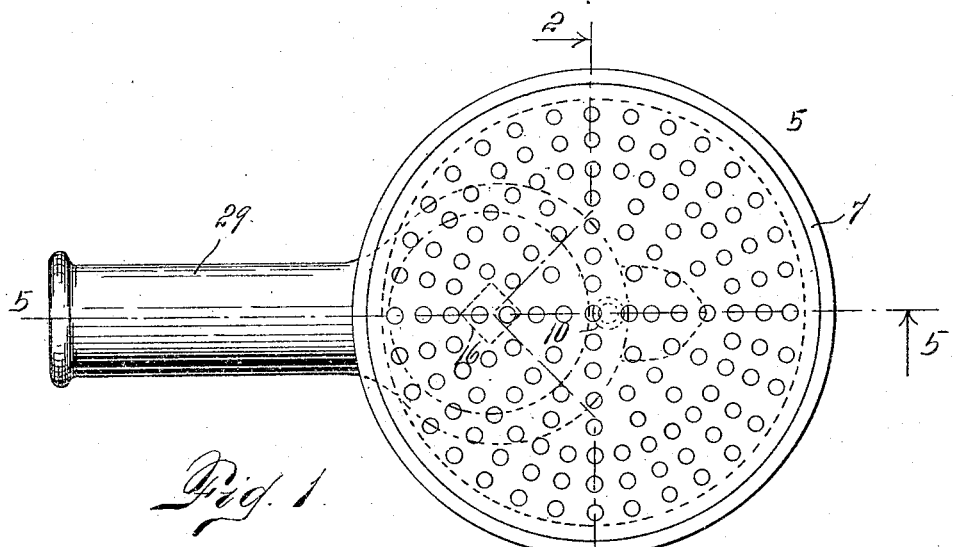

F. H. SAMSON.
SANITARY FLOOR DRAIN.
APPLICATION FILED MAR. 28, 1916.

1,211,966.

Patented Jan. 9, 1917.
2 SHEETS—SHEET 1.

Witnesses
Otto E. Hoddick
John B. Dade

Inventor
Frederick H. Samson.
By
Attorney

F. H. SAMSON.
SANITARY FLOOR DRAIN.
APPLICATION FILED MAR. 28, 1916.
1,211,966.
Patented Jan. 9, 1917.
2 SHEETS—SHEET 2.
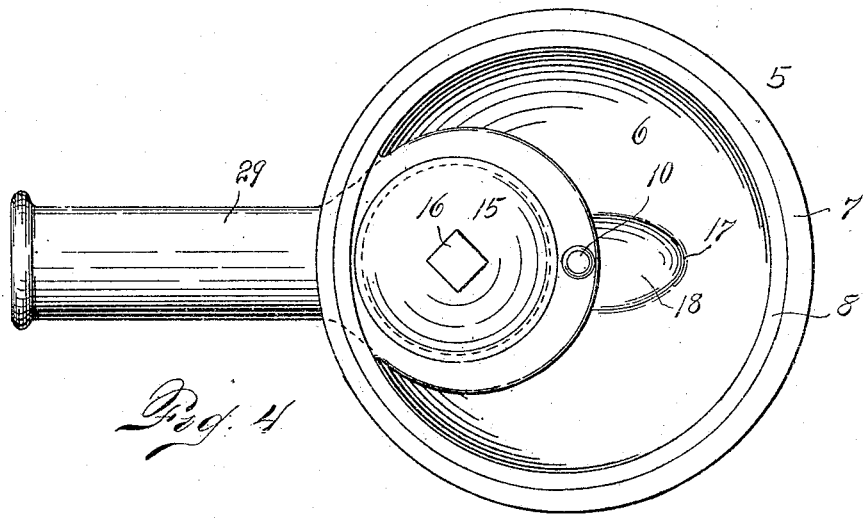
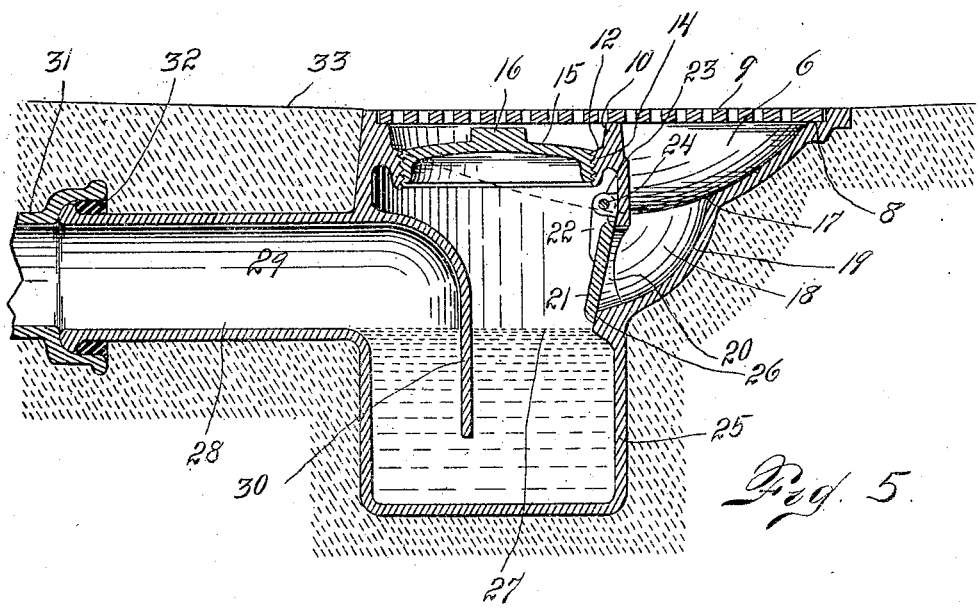
Witnesses
Otto E. Hoddick.
John B. Oades.
Inventor
Frederick H. Samson.
By
Attorney

UNITED STATES PATENT OFFICE.

FREDERICK H. SAMSON, OF DENVER, COLORADO.

SANITARY FLOOR-DRAIN.

1,211,966.   Specification of Letters Patent.   Patented Jan. 9, 1917.

Application filed March 28, 1916. Serial No. 87,167.

*To all whom it may concern:*

Be it known that I, FREDERICK H. SAMSON, a citizen of the United States, residing in the city and county of Denver and State of Colorado, have invented certain new and useful Improvements in Sanitary Floor-Drains; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in sanitary floor drains or means for removing the drainage water and all liquid impurities from stables, garages, laundries and other localities where liquid impurities collect and must be removed that reasonably sanitary conditions may be maintained.

My object is to provide a device of this character which shall prevent the exposure of the water in the liquid seal forming a part of the device, to the atmosphere.

My improved construction includes a gravity actuated check valve adapted to swing inwardly into the upper part of the trap as the drainage water which enters the basin of the device through a perforated cover, flows downwardly and encounters the outer surface of the valve or swinging gate.

One feature of novelty consists in providing the bottom of the basin which receives the drainage water in the first instance, with an abrupt downward curve adjacent the valve, whereby the liquid practically drops or falls, as distinguished from a gentle flow down a gradual incline, into contact with the valve, thus making it practicable to cause the valve to open inwardly, to allow the liquid to enter the trap, thus preventing an accumulation of the liquid in the bottom of the basin before the valve will open. By virtue of my improvement the smallest quantity of drainage liquid will cause the valve to open, whereby the trap receives the liquid virtually as fast as it enters the basin. This is an important feature, since, if there is an accumulation of liquid within the basin and outside of the valve, before the valve opens, this will result in the production of disagreeable odors, thus rendering the device unsanitary and producing general unhealthful conditions in the vicinity of its location.

Another feature of novelty, consists in so constructing the trap that the cover is supported centrally of its area by a lug or projection, thus making it practicable to employ a cover of lighter weight or containing less material than would otherwise be required. Again, the basin of my improved device extends above the top of the trap, thus providing a drainage area of suitable magnitude, and at the same time reducing the space occupied by the device to the minimum. In this construction the top of the trap is closed by a removable cap which is arranged below the perforated cover of the basin of the drain, whereby the entire area of the trap may be utilized for drainage purposes as just explained.

Having briefly outlined my improvement, as well as some of the functions it is intended to subserve, I will proceed to describe the same in detail, reference being made to the accompanying drawing, in which is illustrated an embodiment thereof.

Figures 2, 3:
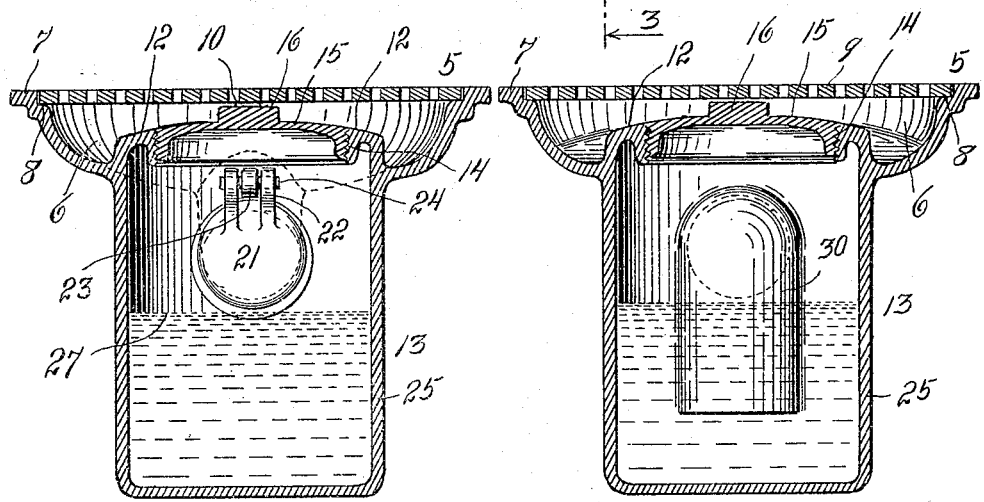

In this drawing, Figure 1 is a top plan view of my improved sanitary floor drain. Fig. 2 is a section taken on the line 2—3, Fig. 1, looking toward the right. Fig. 3 is a section taken on the same line, looking toward the left. Fig. 4 is a top plan view of the device with the perforated cover removed. Fig. 5 is a section taken on the line 5—5, Fig. 1.

The same reference characters indicate the same parts in all the views.

Let the numeral 5 designate the top or basin of my improved device which is circular in shape and provided with a chamber or concavity 6 of suitable depth for the purpose. Surrounding the outer portion of the basin just within the upper surface 7 of the rim of the device, is a circumferential ledge 8 which forms the support for the outer edge of a perforated plate 9 which forms a cover for the basin of the drain. This cover is further supported centrally by means of an upwardly projecting lug 10 formed integral with and projecting upwardly from the top 12 of the trap portion 13 of the device. This trap consists of a receptacle of much less area in horizontal section than the basin, its horizontal area, however, being included within that of the basin and covered and protected by the perforated plate or cover 9.

The top of the trap a short distance below the lower surface of the perforated plate or cover is provided with an interiorly threaded opening 14 adapted to receive a cap 15 which is exteriorly threaded to coöperate with the threads of the opening 14. This cap is centrally provided with a short upward projection 16 which is polygonal in shape preferably square, whereby it is adapted to receive a wrench to facilitate its manipulation for purposes of insertion or removal. In any event, the upper surface of this cap occupies a position below the lower surface of the cover 9 and the top of the cover is curved, and the surface or bottom of the basin surrounding the cover is arranged to slope downwardly toward the upper edge 17 of a relatively small depressed portion 18 of the bottom of the basin. From the upper edge 17 of the depression 18, the bottom of the latter is downwardly curved abruptly as shown at 19 to the circular outlet opening 20 which is normally closed by an inwardly opening plate check valve 21 which has a bifurcated projection 22 arranged to straddle a perforated lug 23 through which a hinge pin 24 is passed. By virtue of this construction the valve is pivotally connected to swing freely inwardly in response to the pressure of liquid entering the abrupt depression 18 of the basin.

The lower portion 25 of the trap member of the device, extends entirely below the lowest part 26 of the opening 20 through which the liquid passes from the basin into the trap, thus making it impossible for any liquid to remain exposed in the basin adjacent the valve. As shown in the drawing, the highest level 27 of the liquid is appreciably lower than the lowest portion 26 of the opening 20. This level of the liquid is of course determined by the lowest level 28 of the drain pipe or nozzle 29 which is cast integral with the body of the device and merges at its inner extremity into a depending partition 30 which extends downwardly into the lower portion of the trap, whereby the liquid must flow downwardly and thence upwardly through the lower portion of the trap before entering the drain nozzle 28. The outer extremity of this drain nozzle may be connected with a drain pipe 31 leading to the sewer, in any suitable manner, one form of such connection being indicated at 32.

From the foregoing description the manner of installing my improved device will be readily understood, special reference being made to Fig. 5 of the drawing, in which the same is shown set into a concrete or cement foundation, whereby the drain nozzle 29 is completely concealed. In fact, the entire device is concealed with the exception of the upper surface of the outer rim of the basin, and the perforated cover 9.

Attention is called to the fact that the surrounding surface 33 of the concrete adjacent the basin, is slightly inclined downwardly to the basin, whereby liquid in the vicinity naturally flows automatically into the basin. This is a feature which may be regulated as desired and according to the circumstances or conditions in any particular locality where the device is installed.

Attention is called to the fact that my improved floor drain is largely composed of a single casting. In other words, the entire structure with the exception of the valve 21, the screw cap 15 and the cover 9, is composed of an integral casting which is an important advantage in a structure of this class.

Having thus described my invention, what I claim is,—

1. A floor drain comprising a basin member and a trap having a liquid seal in its bottom portion, a depressed portion formed integrally with said basin, extending abruptly downwardly below the bottom thereof and terminating with its lower edge above the water level of said trap, the trap being provided with an opening for establishing communication between said depressed portion of the basin and the trap, a check valve adapted to normally close said opening from the atmosphere, a removable cap for the trap adapted to afford easy access to said check valve and a perforated cover for said basin.

2. A floor drain comprising a basin member and a trap having a liquid seal in its bottom portion, a contracted, depressed portion formed integral with said basin extending abruptly downwardly below the bottom thereof and terminating with its lower edge above the water level of said trap, to provide a discharge nozzle for the water, the trap being provided with an opening for establishing communication between said depressed portion of the basin and the trap, and a check valve adapted to normally close said opening from the atmosphere.

3. A floor drain comprising a basin member, and a circular trap integral therewith and having a liquid seal in its bottom portion, a contracted depressed portion extending abruptly downwardly below the bottom of the basin and providing a discharge passage with its lower edge above the water level of said trap, the trap casing provided with an opening for establishing communication between said discharge passage and the trap, a check valve adapted to normally close said opening from the atmosphere, an upstanding lug formed integral with said trap casing, and a perforated, removable cover for said basin centrally supported on said lug.

In testimony whereof I affix my signature, in presence of two witnesses.

FREDERICK H. SAMSON.

Witnesses:
GRACE HUSTON,
A. EBERT O'BRIEN.

Copies of this patent may be obtained for five cents each, by addressing the "Commissioner of Patents, Washington, D. C."